United States Patent
Hu et al.

(10) Patent No.: US 8,992,034 B2
(45) Date of Patent: Mar. 31, 2015

(54) DISPLAY DEVICE AND OPTICAL MULTI-LAYER STRUCTURE FOR DISPLAY DEVICE

(71) Applicants: Innocom Technology(Shenzhen) Co., Ltd., Longhua Town, Bao An District (CN); Chimei InnoLux Corporation, Miao-Li County (TW)

(72) Inventors: Fu-Chi Hu, Miao-Li County (TW); Jia-Huei Lin, Miao-Li County (TW); Chi-Wei Chen, Miao-Li County (TW)

(73) Assignees: Innocom Technlogy (Shenzhen) Co., Ltd., Longhua Town, Shenzhen (CN); Innolux Corporation, Miao-Li County (TW)

( * ) Notice: Subject to any disclaimer, the term of this patent is extended or adjusted under 35 U.S.C. 154(b) by 225 days.

(21) Appl. No.: 13/686,512

(22) Filed: Nov. 27, 2012

(65) Prior Publication Data
US 2013/0170173 A1 Jul. 4, 2013

(30) Foreign Application Priority Data
Jan. 4, 2012 (TW) .............................. 101100270 A

(51) Int. Cl.
G02B 5/30 (2006.01)
F21V 9/14 (2006.01)
G02B 1/10 (2006.01)
G02F 1/1335 (2006.01)

(52) U.S. Cl.
CPC .............. *G02B 5/3083* (2013.01); *F21V 9/14* (2013.01); *G02B 5/30* (2013.01); *G02B 1/105* (2013.01); *G02F 1/133502* (2013.01); *G02F 1/133528* (2013.01); *G02F 2202/28* (2013.01)
USPC ......................................... 362/19

(58) Field of Classification Search
None
See application file for complete search history.

(56) References Cited

U.S. PATENT DOCUMENTS

2007/0177086 A1* 8/2007 Ishitani et al. ............... 349/117

FOREIGN PATENT DOCUMENTS

| JP | 200883307 A | 4/2008 |
| TW | 200846708 A | 12/2008 |

OTHER PUBLICATIONS

English Abstract translation of JP200883307 (Published Apr. 10, 2008).
English Abstract translation of TW200846708 (Published Dec. 1, 2008).
TW Office Action dated Aug. 29, 2014.
TW Application dated Aug. 29, 2014.

* cited by examiner

*Primary Examiner* — Britt D Hanley
(74) *Attorney, Agent, or Firm* — McClure, Qualey & Rodack, LLP

(57) ABSTRACT

An optical multi-layer structure for a flat panel display device is provided. The optical multi-layer structure includes a first optical layer, a second optical layer, a surface strengthening layer, and an adhesive layer. The first optical layer converts a light into a first polarized light. The second optical layer is disposed on the first optical layer and converts the first polarized light into a second polarized light. The surface strengthening layer is disposed on the second optical layer. The adhesive layer is disposed between the second optical layer and the surface strengthening layer, and is in direct contact with the second optical layer and the surface strengthening layer. A flat panel display device having the optical multi-layer structure is also disclosed.

18 Claims, 3 Drawing Sheets

DISPLAY DEVICE AND OPTICAL MULTI-LAYER STRUCTURE FOR DISPLAY DEVICE

CROSS REFERENCE TO RELATED APPLICATIONS

This application claims priority of Taiwan Patent Application No. 101100270, filed on Jan. 4, 2012, the entirety of which is incorporated by reference herein.

BACKGROUND OF THE INVENTION

1. Field of the Invention

The present invention relates to an optical multi-layer structure, and in particular relates to an optical multi-layer structure having improved surface hardness and a flat panel display (FPD) having the optical multi-layer structure.

2. Description of the Related Art

Due to being thin and light weight, and having low power consumption, flat panel display devices such as liquid crystal display devices have solved problems found in cathode ray tube (CRT) display technologies and are widely used in electronic devices, for example laptops, personal digital assistants (PDA), electronic books, projectors, and mobile phones.

In the current market, flat panel display devices are typically two-dimensional (2D) flat panel display devices. With the development of new display technologies, three-dimensional (3D) flat panel display devices have also emerged. Referring to FIG. 1, a cross section of a conventional flat panel display 10 is illustrated. The flat panel display 10 comprises a backlight module 12 and a display structure 16 disposed above the backlight module 12. The display structure 16 may be a liquid display structure or an organic light-emitting display structure. Further, the display structure 16 typically has polarizing films 14 and 18 adhered to its back side and front side, respectively, to convert a light 12a from the backlight module 12 into a linear polarized light. When applying the flat panel display 10 in a stereoscopic or three-dimensional display, a user viewing the display has to wear a viewing device (for example, shutter glasses) to make sure that the user's right eye and left eye can perceive correct images, respectively. Further, an optical film 20 is additionally adhered onto the polarizing film 18 on the front side of the display structure 16 to convert the linear polarized light into a circular polarized light. However, the optical film 20 does not have sufficient surface hardness (i.e. having a pencil hardness lower than 1 H), and as a result, the polarizing film of the three-dimensional flat panel display devices does not satisfy surface hardness requirements (i.e. the pencil hardness being equal to or greater than 3 H).

Thus, an optical multi-layer structure for flat panel display devices that improves or solves the problems described above is needed.

BRIEF SUMMARY OF THE INVENTION

A detailed description is given in the following embodiments with reference to the accompanying drawings.

An exemplary embodiment of an optical multi-layer structure for a flat panel display device comprises a first optical layer, a second optical layer, a surface strengthening layer, and an adhesive layer. The first optical layer converts a light into a first polarized light. The second optical layer is disposed on the first optical layer and converts the first polarized light into a second polarized light. The surface strengthening layer is disposed on the second optical layer. The adhesive layer is disposed between the second optical layer and the surface strengthening layer and in direct contact with the second optical layer and the surface strengthening layer.

An exemplary embodiment of a flat panel display device comprises a backlight module. A display structure is disposed on the backlight module. A first optical layer is disposed on the display structure to convert a light from the backlight module into a first polarized light. A second optical layer is disposed on the first optical layer to convert the first polarized light into a second polarized light. A surface strengthening layer is disposed on the second optical layer. An adhesive layer is disposed between the second optical layer and the first surface strengthening layer and in direct contact with the second optical layer and the first surface strengthening layer.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

A flat panel display device according to the invention will be described below. However, it is readily understood that the embodiments provided by the present invention are merely for the purpose of illustrating specific ways of making and using the invention and should not be taken in a limiting sense. In the disclosure, the term "front side" refers to a side of the flat panel display device facing the viewer, and the term "back side" refers to a side opposite to the front side.

Figure 1:
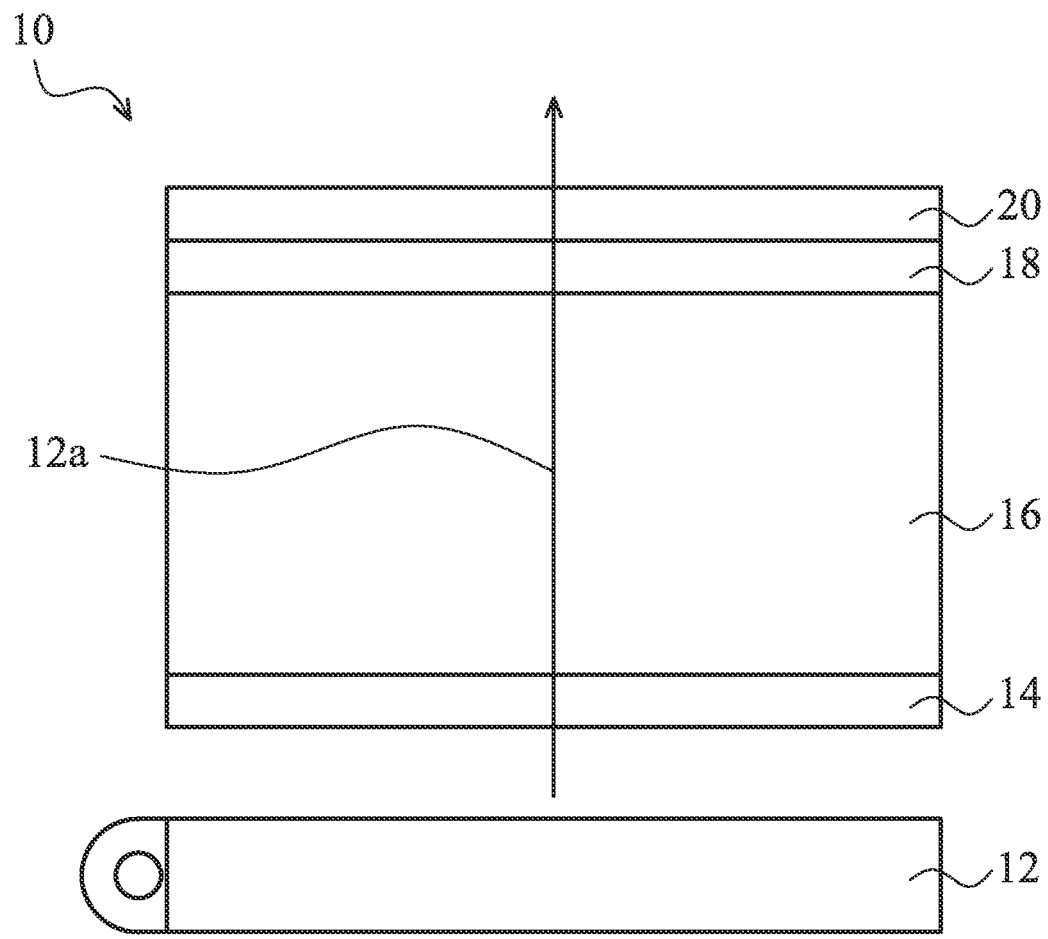
FIG. 1 is cross section of a conventional flat panel display device.
Figure 2:
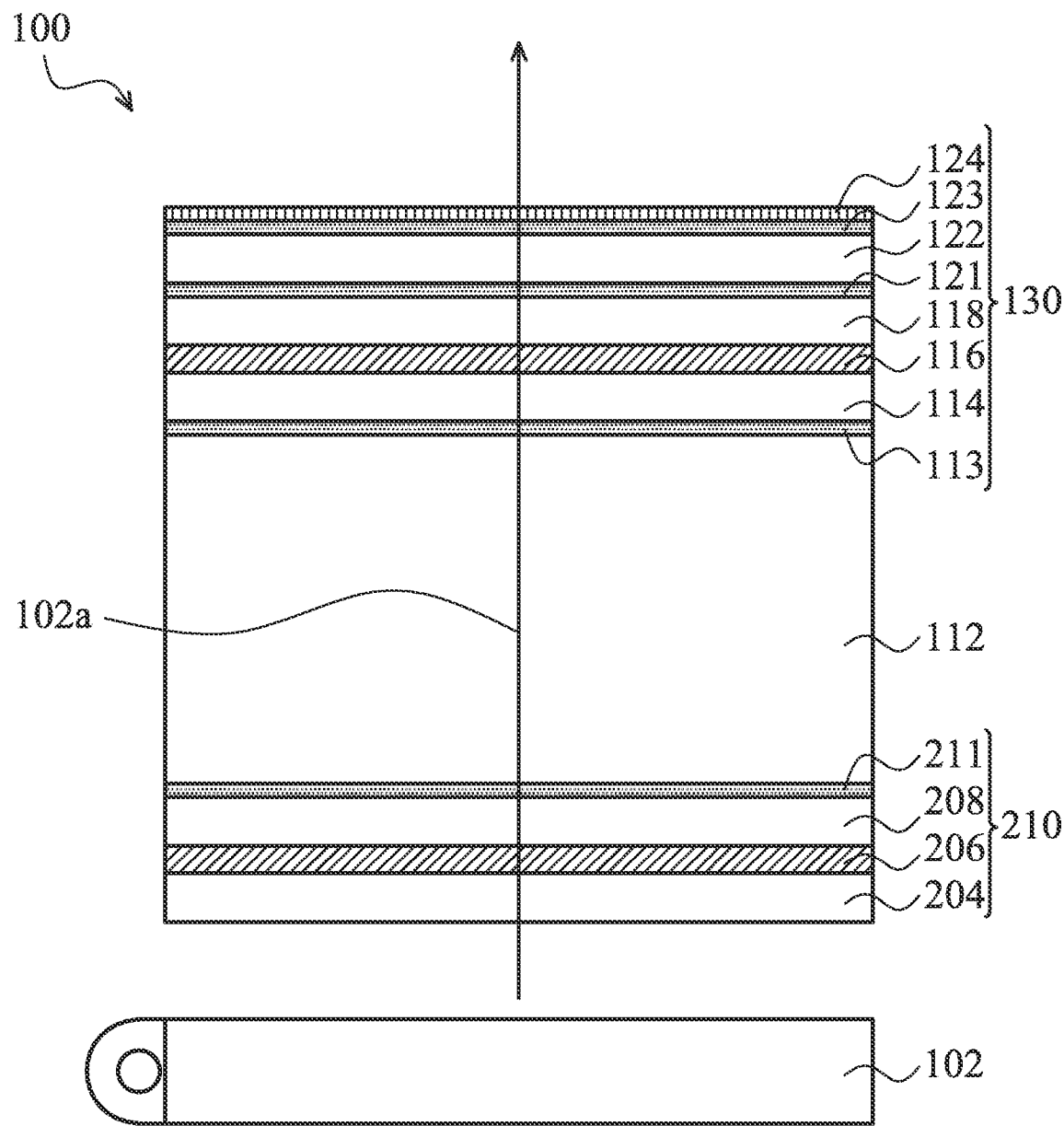
FIG. 2 is a cross section of a flat panel display device according to an embodiment of the present invention.

Referring to FIG. 2, a cross section of a flat panel display device according to an embodiment of the present invention is depicted. In the embodiment, the flat panel display device 100 comprises a backlight module 102, a display structure 112, and an optical multi-layer structure 130. The display structure 112 is disposed on the backlight module 102. In an embodiment, the display structure 112 may be a liquid crystal display (LCD) structure, wherein the LCD structure may comprise a thin film transistor (TFT) array substrate, a color filter (CF) substrate, and a liquid crystal layer between the two substrates. Here, for the sake of simplifying the figures, only a flat layer is depicted. In other embodiments, the display structure 112 may be an organic light-emitting display (OLED) structure or other well-known display structures.

The optical multi-layer structure 130 is disposed on the display structure 112 and comprises a first optical layer 116, a second optical layer 122, a first surface strengthening layer 124, and a first adhesive layer 123. The first optical layer 116 is disposed on the display structure 112 (i.e. the front side) to convert a light from the backlight module 102 to a first polarized light. In an embodiment, the first optical layer 116 may comprise polyvinyl alcohol (PVA) or other resin materials with linear polarization function, and the first optical layer 116 has a thickness of about 20 microns.

The second optical layer 122 is disposed on the first optical layer 116 to convert the first polarized light into a second polarized light. In an embodiment, the second optical layer 112 may be a birefringence material such as cyclo-olefin polymer (COP) or polycarbonate (PC), and the second optical layer 122 has a thickness of about 47 microns. In the embodiment, the first polarized light may be a linear polarized light, and the second polarized light may be a circular polarized light. The viewing device at the user end is adjusted according to the second polarized light (i.e. the circular polarized light) so that the user can see the correct three-dimensional display. In addition, in other embodiments, the first polarized light may be a circular polarized light, and the second polarized light may be a linear polarized light.

In the embodiment, it is noted that the first surface strengthening layer 124 is disposed on the second optical layer 122 to enhance the surface hardness of the optical multi-layer structure 130. In an embodiment, the first surface strengthening layer 124 may be a hard coating that comprises acrylic materials or resin materials, and the first surface strengthening layer 124 has a thickness in a range of about 5 to 6 microns. In another embodiment, the first surface strengthening layer 124 is a hard coating with an anti-glare function.

The first adhesive layer 123 is disposed between the second optical layer 122 and the first surface strengthening layer 124 and is in direct contact with the second optical layer 122 and the first surface strengthening layer 124. In other words, the first surface strengthening layer 124 is adhered onto the second optical layer 122 via the first adhesive layer 123. The first adhesive layer 123 may comprise pressure sensitive adhesives (PSA) and has a thickness of about 25 microns.

In the embodiment, the optical multi-layer structure 130 further comprises a first protective layer 118, a second protective layer 114, a second adhesive layer 113, and a third adhesive layer 121. The first protective layer 118 and the second protective layer 114 may be adhered via polyvinyl alcohol (PVA) (not shown), to the front side and the back side of the first optical layer 116, respectively, to protect the first optical layer 116. In an embodiment, the first protective layer 118 and the second protective layer 114 may comprise triacetyl cellulose (TAC) and have a thickness in a range of about 40 to 80 microns.

In the embodiment, the second adhesive layer 113 is disposed between the first optical layer 116 and the display structure 112, and the second protective layer 114 is disposed between the first optical layer 116 and the second adhesive layer 113 so that the first optical layer 116 may be secured to the front side of the display structure 112 via the second adhesive layer 113. Similarly, the first protective layer 118 disposed between the first optical layer 116 and the second optical layer 122 may secure the second optical layer 122 to the first optical layer 116 via the third adhesive layer 121. In an embodiment, the second adhesive layer 113 and the third adhesive layer 121 may comprise pressure sensitive adhesives and have a thickness of about 25 microns.

In the embodiment, the flat panel display device 100 further comprises an optical multi-layer structure 210 adhered to the back side of the display structure 112. The optical multi-layer structure 210 may comprise a third protective layer 204, a third optical layer 206, a fourth protective layer 208, and a fourth adhesive layer 211. The third optical layer 206 is disposed below the display structure 112 (i.e. the back side) to convert a light 102a from the backlight module 102 to a polarized light. In an embodiment, the third optical layer 206 may comprise the same material as the first optical layer 116 and has a thickness of about 20 microns.

The third protective layer 204 and the fourth protective layer 208 may be adhered to the back side and the front side of the third optical layer 206 via a glue(for example, Polyvinyl Alcohol(PVA))(not shown), respectively, to protect the third optical layer 206. In an embodiment, the third protective layer 204 and the fourth protective layer 208 may comprise the same material as the first protective layer 118 and the second protective layer 114 and have a thickness in a range of about 40 to 80 microns.

The fourth adhesive layer 211 is disposed between the third optical layer 206 and the display structure 112 so that the third optical layer 206 may be secured to the back side of the display structure 112 via the fourth adhesive layer 211. Similarly, the fourth adhesive layer 211 may comprise a PSA having a thickness of about 25 microns.

According to the embodiments described above, since the first surface strengthening layer 124 covers the second optical layer 122, the surface hardness of the optical multi-layer structure 130 is improved, thus preventing the optical multi-layer structure 130 from being damaged by external forces.

Figure 3:
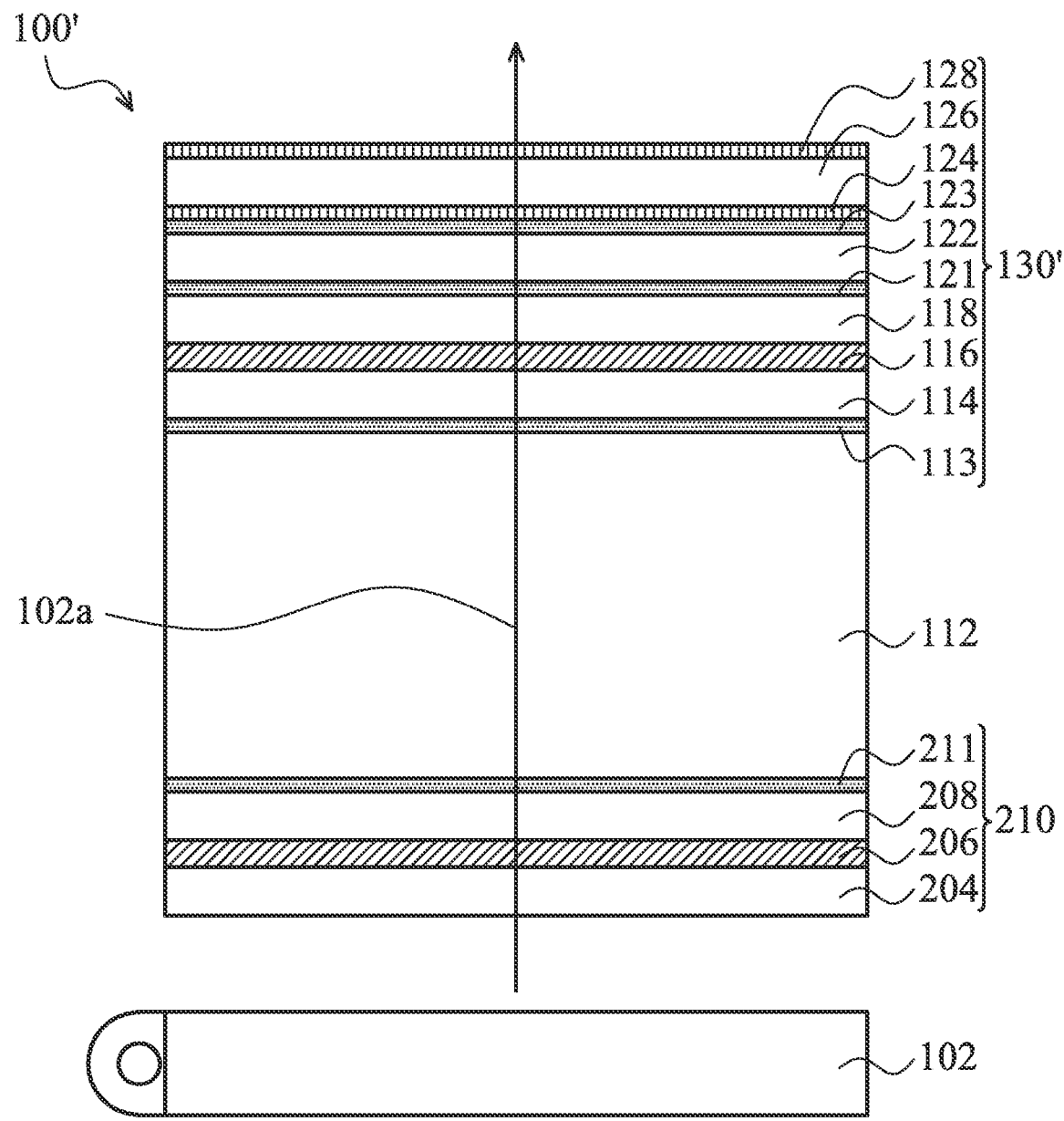
FIG. 3 is a cross section of a flat panel display device according to another embodiment of the present invention.

Referring to FIG. 3, a cross section view of a flat panel display device according to another embodiment of the present invention is depicted, wherein elements that are the same as in FIG. 2 have the same reference numerals and their descriptions are omitted. In the embodiment, the flat panel display display 100' is similar to the flat panel display display 100 shown in FIG. 2. However, unlike the optical multi-layer structure 130 as shown in FIG. 2, the optical multi-layer structure 130' disposed on the display structure 112 in the flat panel display device 100' in the embodiment further comprises a second surface strengthening layer 128 and a buffer layer 126. In the embodiment, it is noted that the second surface strengthening layer 128 is disposed on the first surface strengthening layer 124 (i.e. the buffer layer 126 is disposed between the first surface strengthening layer 124 and the second surface strengthening layer 128) to further improve the surface hardness of the optical multi-layer structure via the two surface strengthening layers. In an embodiment, a material of the first surface strengthening layer 124 and the second surface strengthening layer 128 may be a hard coating, which comprises acrylic materials or resin materials, and the second surface strengthening layer 128 has a thickness in a range of between 5 and 6 microns. In another embodiment, at least one of the first surface strengthening layer 124 and the second surface strengthening layer 128 is a hard coating with an anti-glare function.

Further, the buffer layer 126 is disposed between the first surface strengthening layer 124 and the second surface strengthening layer 128 to prevent stress between the second optical layer 122 and the surface strengthening layers 124 and 128, which causes bending to occur, thus, ensuring that the second optical layer 122 may be smoothly adhered onto the first optical layer 116. In an embodiment, the buffer layer 126 may comprise triacetyl cellulose (TAC) and has a thickness in a range of about 40 to 80 microns.

According to the embodiments described above, since the optical multi-layer structure 130' has two surface strengthening layers 124 and 128, the surface hardness of the optical multi-layer structure 130' is improved. Further, since there is a buffer layer between the two surface strengthening layers 124 and 128, bending of the multiple layers are prevented, thus improving the reliability of the optical multi-layer structure 130'.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical multi-layer structure for a display device, comprising:
   a first optical layer to convert a light into a first polarized light;
   a second optical layer disposed on the first optical layer to convert the first polarized light into a second polarized light;
   a first surface strengthening layer disposed on the second optical layer;
   an adhesive layer disposed between the second optical layer and the first surface strengthening layer and in direct contact with the second optical layer and the first surface strengthening layer; and
   a second surface strengthening layer disposed on the first surface strengthening layer; and
   a buffer layer disposed between the first surface strengthening layer and the second surface strengthening layer.

2. The optical multi-layer structure of claim 1, wherein at least one of the first surface strengthening layer and the second surface strengthening layer has an anti-glare function.

3. The optical multi-layer structure of claim 1, wherein the first surface strengthening layer and the second surface strengthening layer comprise acrylic materials or resin materials.

4. The optical multi-layer structure of claim 1, wherein the buffer layer comprises triacetyl cellulose.

5. The optical multi-layer structure of claim 1, further comprising:
   a first protective layer disposed between the first optical layer and the second optical layer; and
   a second protective layer disposed below the first optical layer.

6. The optical multi-layer structure of claim 5, wherein the first protective layer and the second protective layer comprise triacetyl cellulose.

7. The optical multi-layer structure of claim 1, wherein the first optical layer comprises polyvinyl alcohol.

8. The optical multi-layer structure of claim 1, wherein the second optical layer comprises a birefringence material.

9. The optical multi-layer structure of claim 8, wherein the birefringence material comprises cyclo-olefin polymer or polycarbonate.

10. A display device, comprising:
    a backlight module;
    a display structure disposed on the backlight module;
    a first optical layer disposed on the display structure to convert a light from the backlight module into a first polarized light;
    a second optical layer disposed on the first optical layer to convert the first polarized light into a second polarized light;
    a first surface strengthening layer disposed on the second optical layer;
    a first adhesive layer disposed between the second optical layer and the first surface strengthening layer and in direct contact with the second optical layer and the first surface strengthening layer; and
    a second surface strengthening layer disposed on the first surface strengthening layer; and
    a buffer layer disposed between the first surface strengthening layer and the second surface strengthening layer.

11. The display device of claim 10, wherein at least one of the first surface strengthening layer and the second surface strengthening layer has anti-glare function.

12. The display device of claim 10, wherein the first surface strengthening layer and the second surface strengthening layer comprise acrylic materials or resin materials.

13. The display device of claim 10, wherein the buffer layer comprises triacetyl cellulose.

14. The display device of claim 10, further comprising:
    a first protective layer disposed between the first optical layer and the second optical layer;
    a second adhesive layer disposed between the first optical layer and the display structure; and
    a second protective layer disposed between the first optical layer and the second adhesive layer.

15. The display device of claim 14, wherein the first protective layer and the second protective layer comprise triacetyl cellulose.

16. The display device of claim 14, wherein the first adhesive layer and the second adhesive layer comprise a pressure sensitive adhesive.

17. The display device of claim 10, wherein the first optical layer comprises polyvinyl alcohol.

18. The display device of claim 10, wherein the second optical layer comprises cyclo-olefin polymer or polycarbonate.

* * * * *